United States Patent [19]

Hartkorn

[11] 3,767,046
[45] Oct. 23, 1973

[54] LIQUID PURIFICATION METHOD
[76] Inventor: Karl Heinz Hartkorn, Hamburger Strasse 17, Russelsheim, Germany
[22] Filed: Dec. 6, 1971
[21] Appl. No.: 205,171

[30] Foreign Application Priority Data
Dec. 7, 1970  Austria .................. A 10983/70

[52] U.S. Cl. ................................ 204/149, 204/152
[51] Int. Cl. ............................ C02c 5/12, B01k 1/20
[58] Field of Search ......................... 204/152, 149; 210/44

[56] References Cited
UNITED STATES PATENTS

| 398,101 | 2/1889 | Webster, Jr. | 204/149 |
| 892,486 | 7/1908 | Woolf | 204/149 |
| 930,023 | 8/1909 | Bartley | 204/149 |
| 1,069,169 | 8/1913 | Parker | 204/149 X |
| 1,378,120 | 5/1921 | Landreth | 204/149 |
| 3,518,174 | 6/1970 | Inoue | 204/149 |
| 3,600,286 | 8/1971 | Sabins | 204/149 |
| 3,664,951 | 5/1972 | Armstrong | 204/149 X |

Primary Examiner—John H. Mack
Assistant Examiner—A. C. Prescott
Attorney—Kurt Kelman

[57] ABSTRACT

A batch of an aqueous liquid to be purified is charged into a treating vessel where the batch is subjected to an electrical treatment by passing an electric current through a cathode and soluble anode to cause the substances contained in the liquid which are to be removed to precipitate into particles forming a floating sludge on the liquid. If desired, reagents such as acids, alkalis or hydrogen peroxide may be added to the batch of liquid. The precipitation or flocculation is favored by thoroughly and intensely stirring the aqueous liquid bath during the electrical treatment in the closed vessel as well as thereafter and before the precipitated substances are separated from the aqueous liquid after removal from the vessel, as well as by retaining a residual portion of the treated liquid in the vessel as an addition for the subsequent batch to be treated therein. It is preferred to use a direct current obtained from a polyphase rectification.

24 Claims, 19 Drawing Figures

LIQUID PURIFICATION METHOD

The present invention relates to improvements in the purification of an aqueous liquid, such as waste water and sewage, containing substances dissolved or suspended therein which are to be removed from the liquid by passing an electric current through the liquid and separating the resultant precipitated or flocculated particles therefrom.

In a known purification method of this type, the aqueous liquid to be purified passes through an electrolytic treatment chamber in a continuous flow and is subjected therein to an electrical treatment. The treated liquid is then passed through a filter or is conveyed to a separation vessel where the impurities are separated, for instance by sedimentation. This method requires a great amount of electric energy and reduces the biological oxygen requirement to a relatively small degree.

It is also known to remove cellulosic material from the waste water coming from paper mills by electrolytic treatment and subsequent flotation with a high expenditure of electric power.

It is the primary object of this invention to provide an improvement in purification methods of the indicated type which produce a very high degree of purification at a low expenditure of power while simultaneously reducing the treatment time.

The above and other objects of the invention are accomplished in a batch method wherein successive batches of the aqueous liquid to be purified are charged into a treating vessel. The vessel is closed to prevent inflow or outflow of the aqueous liquid batch, and an electric current is then passed through a cathode and a soluble anode immersed in the aqueous liquid batch in the vessel to subject the liquid to an electrical treatment which causes the substances in the liquid to precipitate into particles forming a floating sludge on the liquid. The aqueous liquid is thoroughly stirred during the electrical treatment in the closed vessel to mix the floating sludge with the liquid. After the electrical treatment has been concluded, the vessel is opened to permit a major portion of the treated aqueous liquid batch to flow out of the vessel while a residual portion of the treated liquid is retained in the vessel as an addition for the subsequent batch to be treated in the vessel. The precipitated substances from the major portion of the aqueous liquid removed from the vessel are then separated, by sedimentation or by flotation, to recover the purified liquid.

In a preferred embodiment, electric current from a current supply network is subjected to polyphase rectification to obtain a current having a ripple frequency in excess of that of the current from the supply network, and the high-frequency ripple direct current is supplied to the cathode and anode.

It is also preferred thoroughly to stir the treated aqueous liquid bath after the electrical treatment and before separation takes place.

It is most useful to provide a series of treating vessels which are sequentially charged with respective ones of the aqueous liquid batches, to subject the respective batches sequentially to the electrical treatment and stirring, and to open the vessels sequentially in such timed sequence that a substantially continuous flow of treated aqueous liquid comes from the series of vessels.

The entire operation is perferably automatically controlled by control signals responsive to sampled physico-chemical parameters of the liquid batch or batches under electrical treatment.

The above and other objects, advantages and features of the present invention will be more fully understood by reference to the following detailed description of certain now preferred embodiments thereof, taken in conjunction with the accompanying drawing wherein FIGS. 1 and 2 are schematic patterns illustrating two modifications in the timed sequence of the treatment of a liquid in a four-vessel installation;

FIG. 4b is an elevational side view of the double electrode of FIG. 4a;

FIG. 6b is a partial top view of FIG. 6a;

Figure 9:
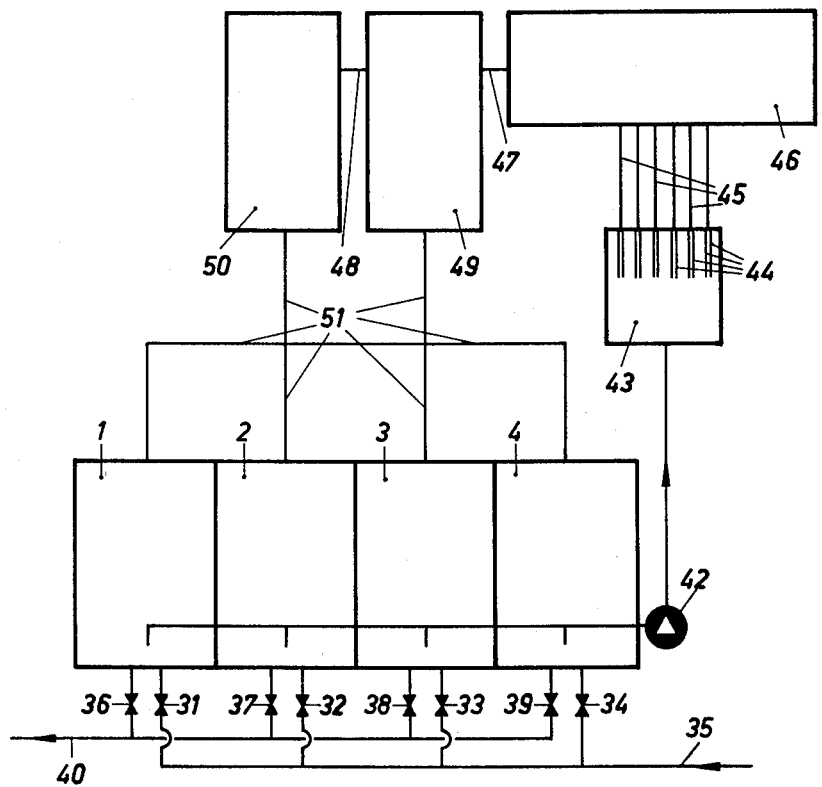
Figures 10A, 10B:
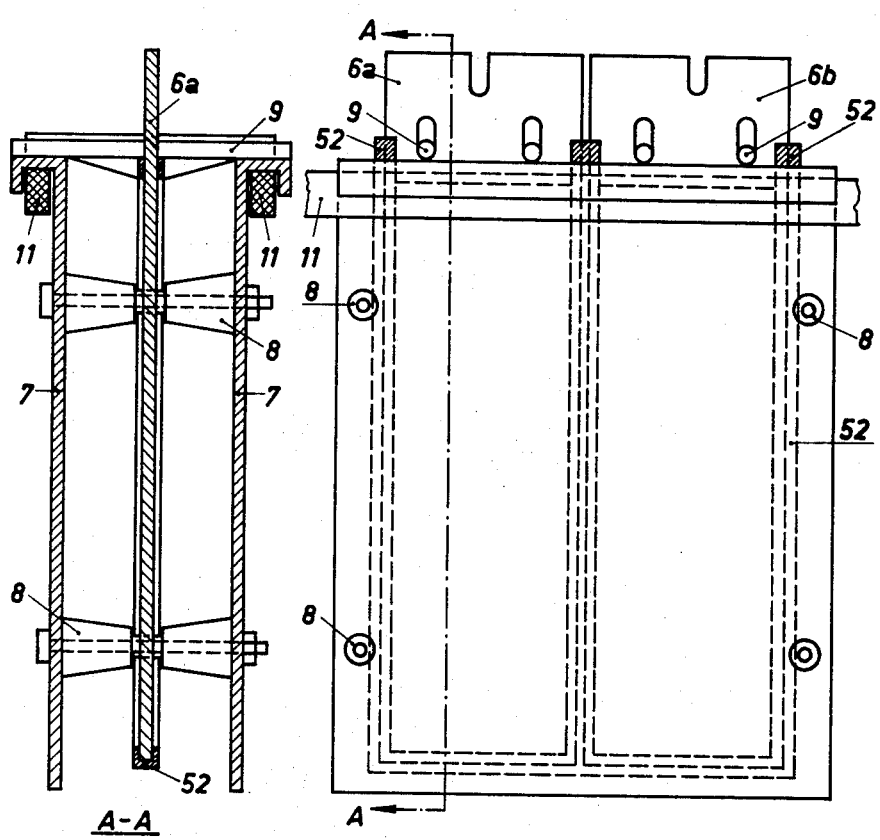
Figure 11:
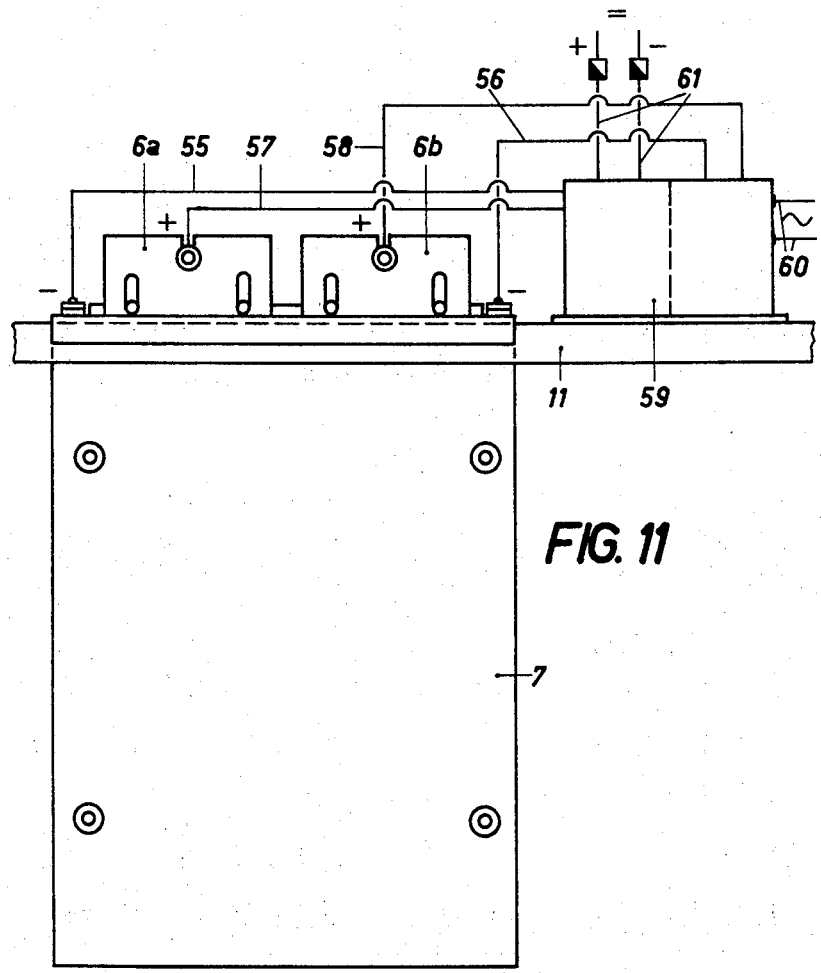
Figure 12:
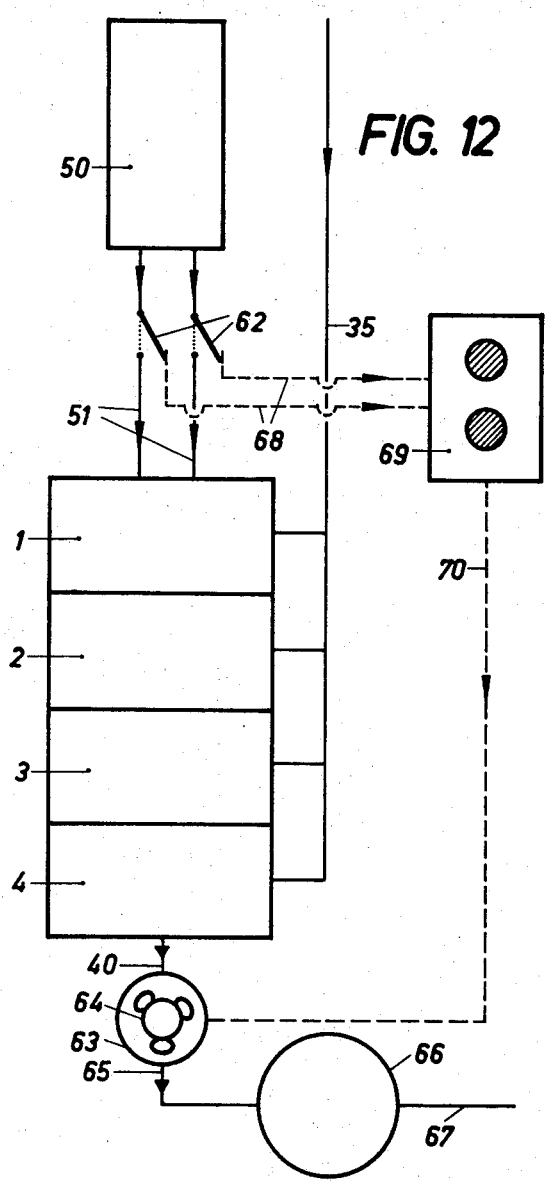
Figure 13:
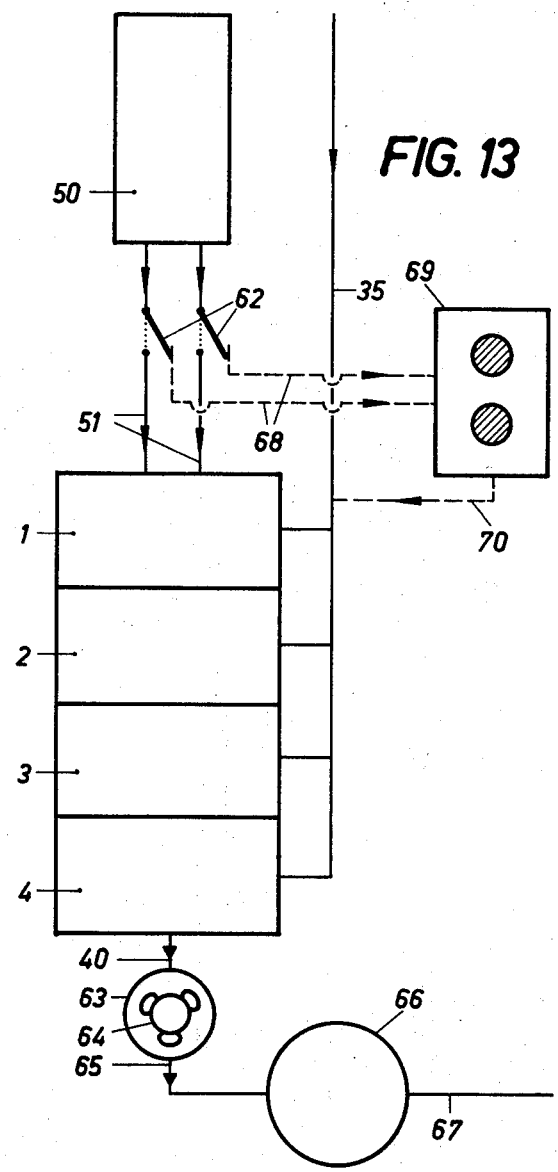
Figure 14A:
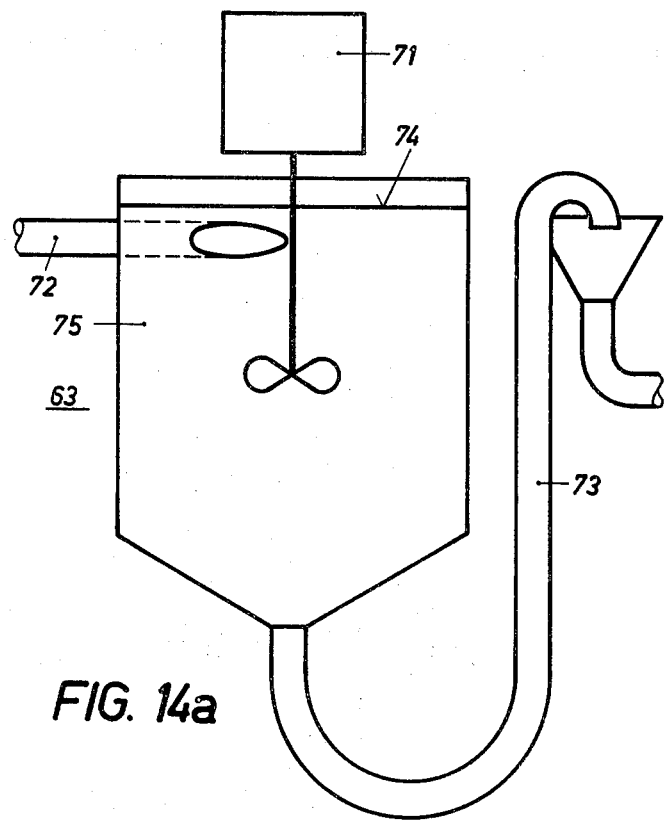
Figure 14B:
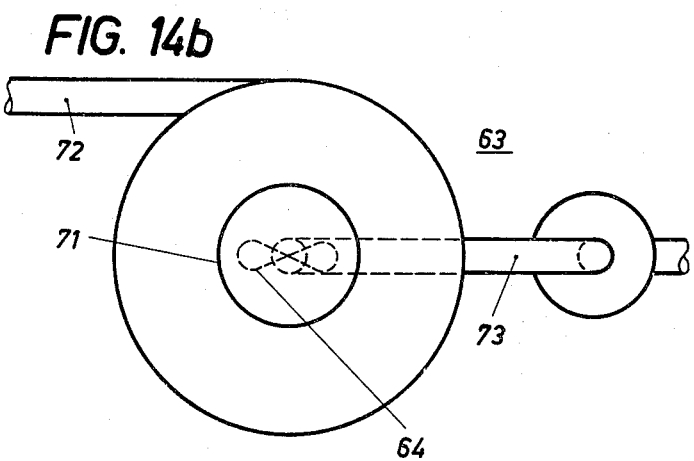

FIG. 8 again shows a sectional view of part of a treatment vessel, also illustrating the high-speed agitator in the vessel;

FIG. 9 shows a four-vessel installation and a circuit diagram of the current supply and control circuit for each vessel;

FIG. 10a is a vertical section showing another embodiment of a double electrode, with two anodes;

FIG. 10b is an elevational side view of the double electrode of FIG. 10a;

FIG. 11 shows an electrode of FIGS. 10a and 10b, fitted with a switching instrument for the electric current supply to the electrodes;

FIGS. 12 and 13 schematically illustrate two embodiments of a complete installation for purifying aqueous liquids in accordance with this invention;

FIG. 14a is a side view, partly in section, of a useful feature of the installation; and FIG. 14b is a top view of FIG. 14a.

Figure 1:
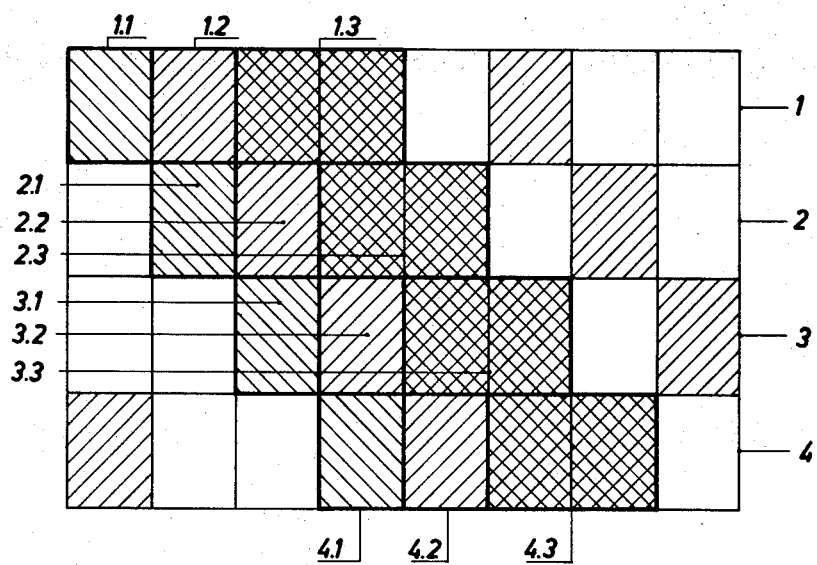

Referring now to the drawing, wherein like reference numerals designate like parts functioning in a like manner in all figures so as to obviate redundancy in the description, the timed sequence of the treatment stages will first be described in connection with the schematic grid-like patterns of FIGS. 1 and 2. The sequence of filling each vessel with a liquid to be treated, treating the liquid, and then emptying the vessel is described and illustrated in connection with a four-vessel installation. The timed sequence of steps is shown to proceed from left to right in each horizontal row of the grid pattern, each row relating to a respective one of vessel, 1, 2, 3 and 4.

To enable the installation to be filled continuously with an aqueous liquid to be treated therein, the respective vessels are filled in successive time periods, vessel 1 being filled in time period 1.1, vessel 2 being filled in time period 2.1 subsequent to time period 1.1, vessel 3 being filled in time period 3.1 subsequent to time period 2.1, and vessel 4 being filled in time period 4.1 subsequent to time period 3.1. Similarly, the electrical treatment of the liquid in each vessel is effected in the following time periods 1.2, 2.2, 3.2 and 4.2, respectively, these time periods also being subsequent to each other, as shown. Likewise successively, the vessels are emptied in the following time periods 1.3, 2.3, 3.3 and 4.3, thus assuring a substantially continuous outflow of treated liquid from the installation since, at the end of the emptying period of vessel 1, the emptying period for vessel 2 begins, and so on.

If 7.5 minutes are allowed for each of the filling and emptying times and up to 15 minutes are allowed for the electric treatment time, the total dwell time for each batch of treated liquid in the vessel is 30 minutes so that two treatment cycles per hour can be effectuated in each vessel. The current supply circuit is so arranged that it may be switched from vessel to vessel if the electric treatment time is only 7.5 minutes since this treatment will be effected only in one vessel at a time, as shown in FIG. 1.

Figure 2:
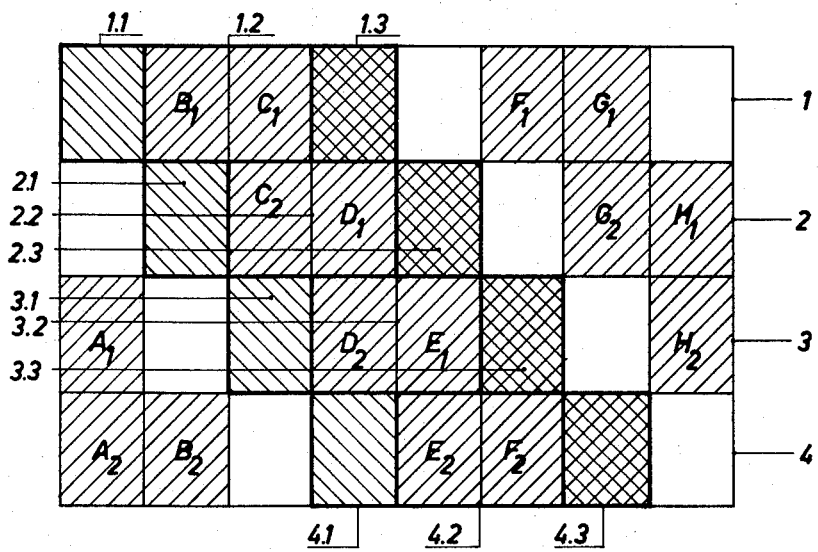

In the arrangement of FIG. 2, two separate electric supply circuits are connected to the installation so that electric treatment may be extended up to 15 minutes in each vessel, which causes overlapping of electrical treatment times in adjacent vessels.

The electrical treatment time segments in each vessel are shown by letters A to H in FIG. 2, the index numbers attached to each letter indicating the connection to a respective one of the electric supply circuits. Thus, for instance, one of the circuits will feed the electrodes during the time segments $B_1$, $C_1$ in time period 1.2 in vessel 1. While this one circuit still operates in time segment $C_1$, which overlaps time segment $C_2$ in time period 2.2 in vessel 2, the other circuit will be used to feed the electrodes during time segment $C_2$, continuing operation during subsequent time segment $D_2$ in time period 3.2 in vessel 3, and in time segment $E_2$ and $F_2$ in time period 4.2 in vessel 4, which segments succeed each other. At the same time, the one circuit will feed the electrodes during time segment $D_1$ in time period 2.2 after it has finished operation in time segment $C_1$, continuing subsequently in time segments $E_1$, $F_1$, $G_1$ and $H_1$. Thus, current will be fed continuously by the two circuits to sequential treatment time segments in the four vessels, as shown in the pattern of FIG. 2. It is, of course, also possible to disconnect respective circuits during any of these time segments if shorter treatment times are desired.

Suitably programmed valves are provided for filling and emptying the respective vessels at set intervals. Since the treatment operates on electric current, it will be most useful to operate the control valve system electrically, too, although solenoid valves may be replaced by pressure fluid operated valves, if desired. Such valve systems are well within the skill of the art. Equally well known valve controls for the automatic operation of the valves may include liquid level or liquid amount meters or indicators producing control signals whose pulses may be fed to a digital computer for opening and closing the valves in the liquid conduits which feed the liquid to be treated to the respective vessels and empty these vessels after each liquid batch has been treated.

Figure 3A:
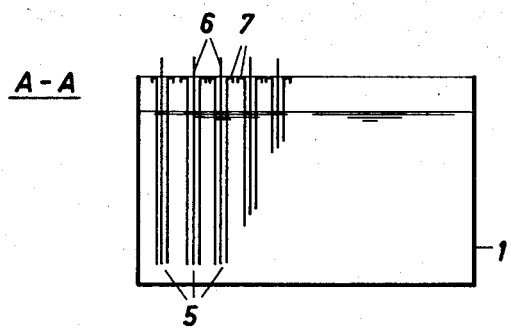
FIG. 3a is a section along line A—A of FIG. 3b of a four-vessel installation, each of the vessels holding a plurality of double electrodes for the treatment of the liquid.
Figure 3B:
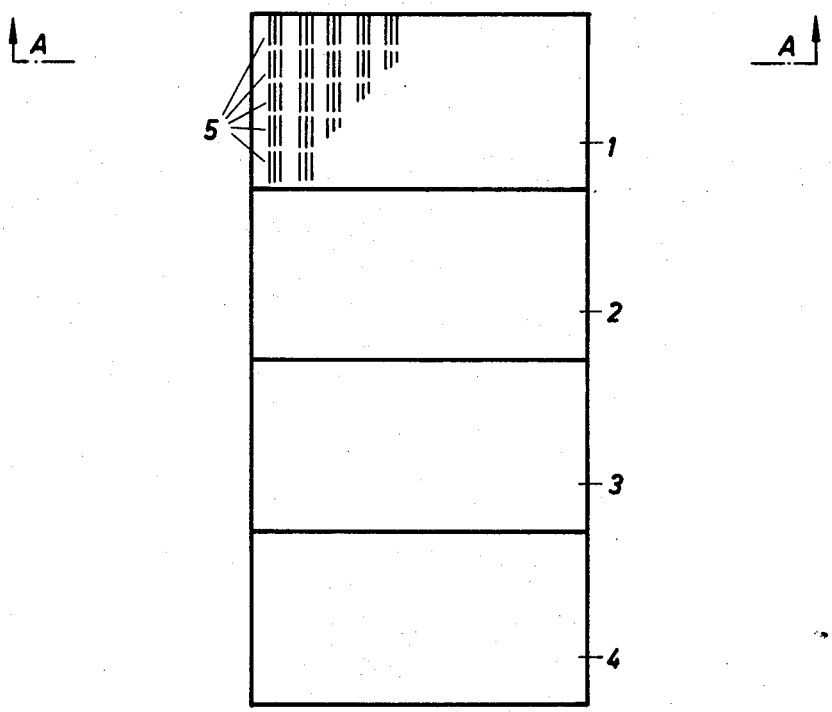
FIG. 3b is a top view of the installation.

FIGS. 3a and 3b schematically show the vessels 1, 2, 3, 4 each having arranged therein double electrodes 5 for conducting electric current through the liquid in the vessel. Each double electrode comprises an anode 6 and cathode 7 more clearly illustrated in FIGS. 4a and 4b, showing one embodiment of a double electrode useful in the present treatment method.

Double electrodes of the illustrated type make it possible to treat large amounts of liquid by way of the reactions caused by the current flowing through the liquid. A further advantage of such double electrodes resides in the fact that they may be suspended or otherwise arranged closely side by side in the treating vessels without causing the danger of short circuits. Furthermore, the inner electrode or anode 6 of such double electrodes is mechanically well protected by the two outer electrodes or cathodes 7, which makes it possible to provide exceedingly thin anodes. As the following detailed description of the flow directions of the liquid in the treating vessel will show, the vertically suspended double electrodes also provide considerable advantages in this respect.

Figure 4A:
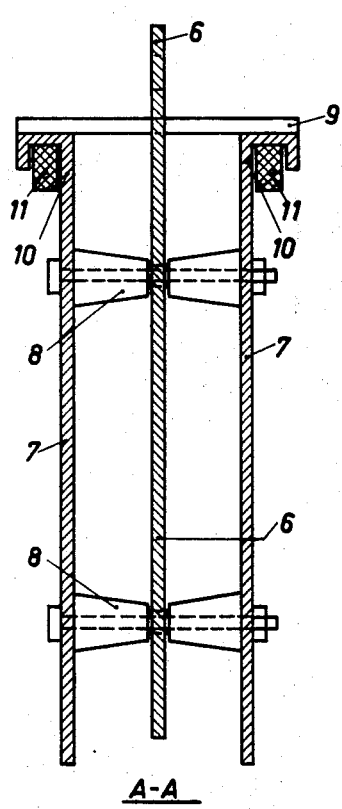
FIG. 4a is a vertical section showing one of the double electrodes and its support.
Figure 4B:
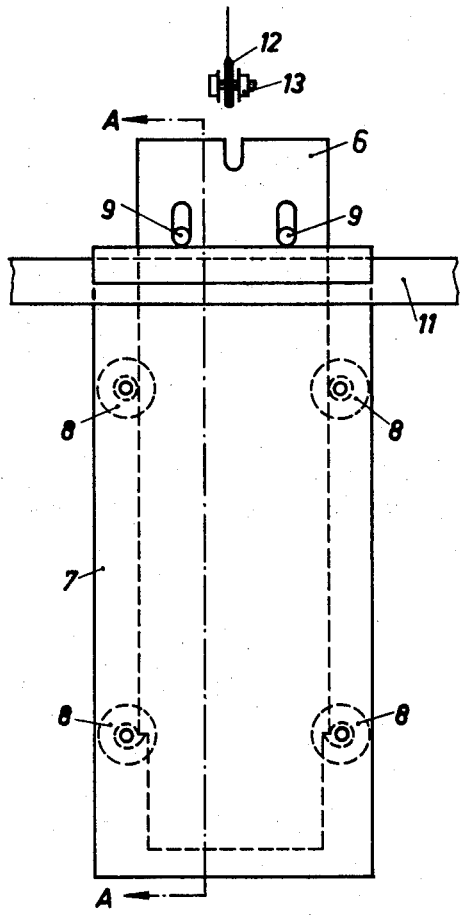

As shown in FIGS. 4a and 4b, the intermediate electrode 6, operated as an anode, is mounted on insulating carrier rods 9 which pass through slots in the upper portion of the electrode plate, insulating spacers 8, 8 separating the anode 6 from the two outer electrode plates 7, 7 operated as cathodes. The spacers are mounted on transverse carrier rods or bolts fixed to the cathodes and passing through registering holes in the anode, as shown in FIG. 4a. The upper ends 10 of the cathodes 7, 7 are U-shaped to form hooks for suspending the cathodes vertically on carrier rods 11 which may be affixed to the vessel walls. The carrier rods 11 may serve as electric conductors connected to one pole of an electric current supply circuit to feed current to the cathodes while the other pole of the circuit is connected to the conductor 12 whose terminal 13 is clamped to the anode.

It is preferred to make the cathode plates of an anti-magnetic metal, for instance anti-magnetic steel, whose potential differs from that of the anode material so a voltage in excess of the Faraday decomposition voltage of water, i.e., 1.67 Volt, is produced.

As will be apparent from FIGS. 4a and 4b, the anode plate 6 may be readily replaced in the illustrated double electrode. Therefore, depending on the required treatment conditions for the specific liquid treated, different anodes may be mounted in the vessels so as to obtain optimum precipitation or flocculation reactions in the suspension under treatment.

Figure 5:
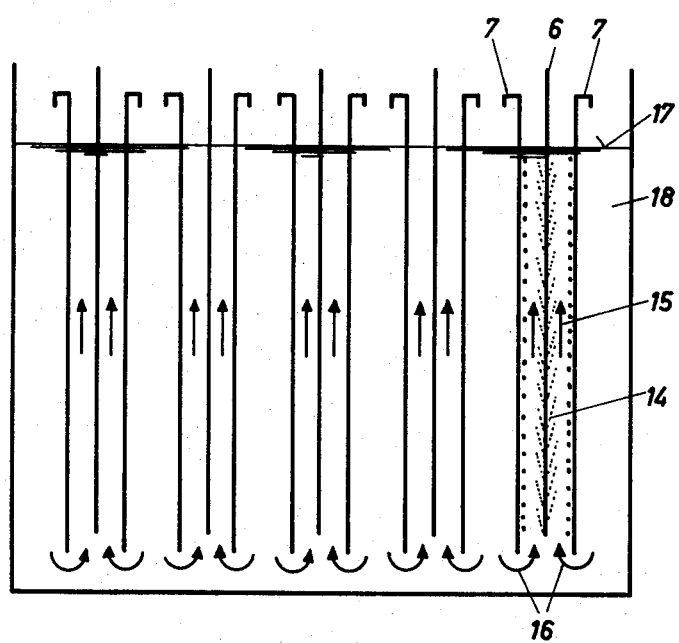
FIG. 5 is an enlarged schematic side view of one vessel holding a plurality of double electrodes, the direction of the flow of the treated liquid being indicated by arrows.

As is well illustrated in FIG. 5, a convection is produced in the double electrodes, which makes it possible to subject large amounts of liquids to the reactions caused by the electric current. Even in the first phase of the treatment, as soon as electric current is passed through the liquid, untreated liquid is passed through the reaction chambers of the double electrodes without interfering with the electrical neutralization of the suspension and the migration of the ions.

As may be noted by observation of the oxygen bubbles 14 adjacent the anode 6 of each vertically extending double electrode, turbulent upward streams of liquid are created in the right and left reaction chambers of the double electrode between the anode and the cathodes thereof, the direction of the liquid flow being indicated by arrows 15. The liquid below the double electrodes is moved into the reaction chambers of each double electrode in the direction of arrows 16, 16. Since the electrodes extend above the level 17 of liquid 18, the liquid flows away horizontally from the reaction chamber in the region of the liquid surface 17, as indicated by arrows 19, 19 in FIG. 6b.

Figure 6A:
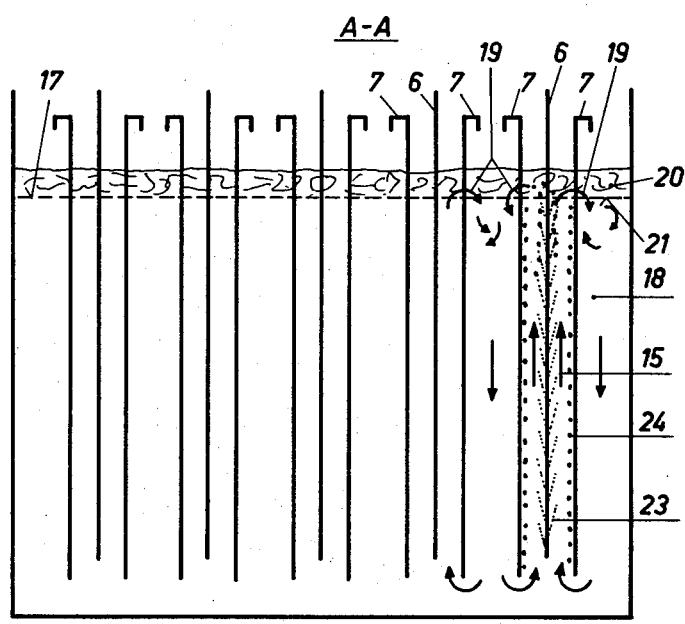
FIG. 6a is a section along line A—A of FIG. 6b of a vessel holding a plurality of double electrodes, the flow direction of the treated liquid between the electrodes being shown in greater detail.
Figure 6B:
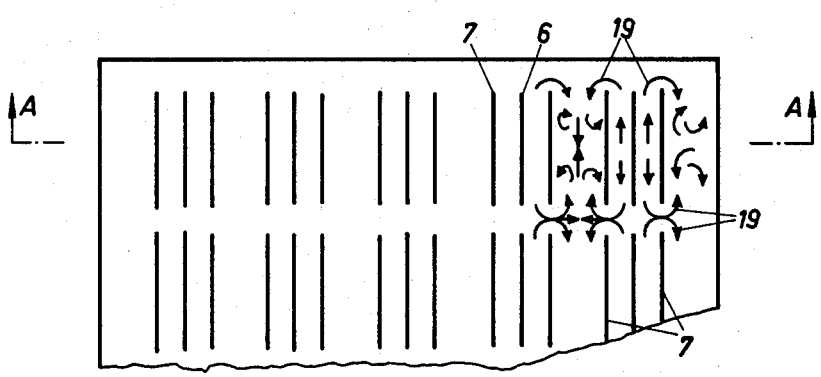

The particles suspended in the liquid 18 are coagulated under the influence of the applied electrical field and the migrating metal ions, and the attachment of $H_2$ ions to the coagulated particles causes the same to float to the surface 17, the diffusion of the $H_2$ gas being partially prevented at the surface by the formation of sludge 20 shown in FIG. 6a.

Figure 7:
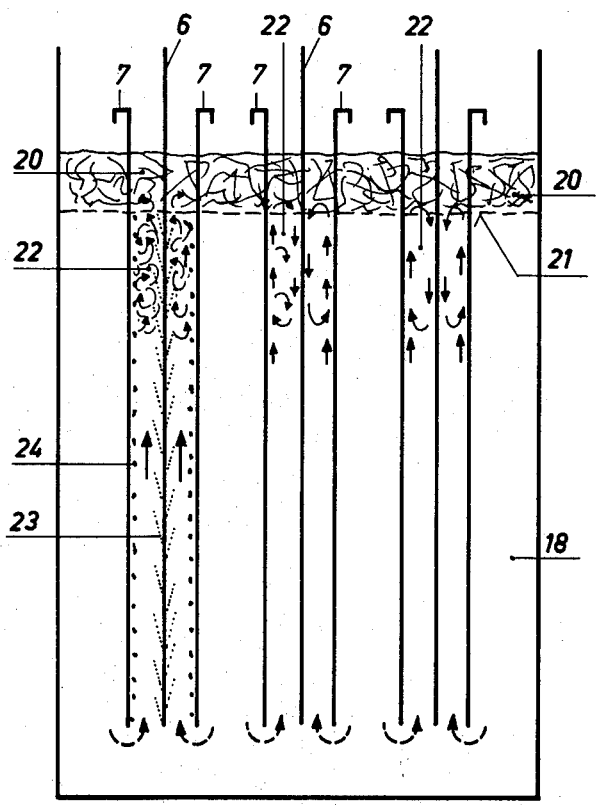
FIG. 7 is a sectional view of a vessel also showing the direction of flow of the treated liquid, with particular attention to the liquid region immediately below the floating sludge.

As illustrated in FIG. 7, these reactions cause a turbulent change in the direction of the liquid flow underneath the lower face 21 of sludge layer 20, as shown by the arrows in region 22 immediately below the sludge layer. This reversal of the liquid flow direction causes some of the coagulated sludge particles to be returned to the reaction chambers between the anode and cathodes so that aqueous liquid as well as coagulated or flocculated particles are constantly brought back into the diffusion layer region of anode 6. The oxygen bubbles in the diffusion layer along the surfaces of anode 6 are designated 23 while the $H_2$ bubbles along the cathode surfaces are designated 24.

Figure 8:
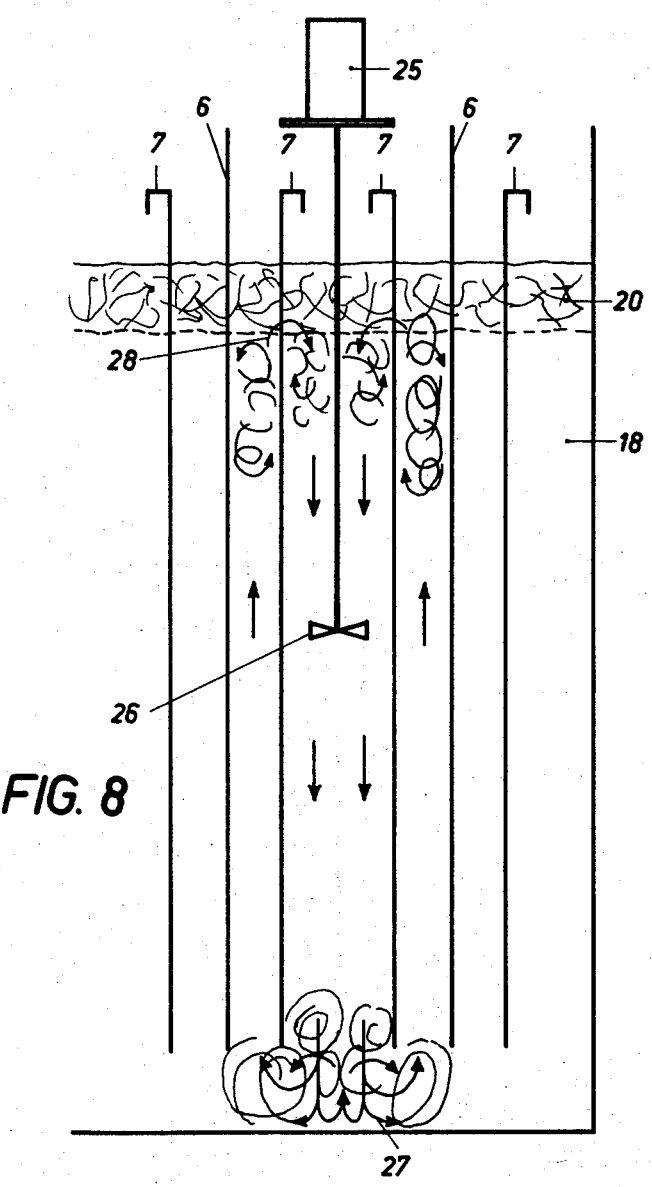

As shown in FIG. 8, agitation or stirring of the liquid in the treating vessel further influences the reaction in the diffusion layers of the anode. This holds true particularly for the current densities in the diffusion layers, turbulent liquid flows causing short-term changes in the thickness of the diffusion layer and irregular currents.

FIG. 8 shows a high-speed agitator comprising a motor 25 rotating the agitating vane 26 to force the liquid 18 in the vessel energetically downwardly, the sludge 20 floating on the liquid surface also being pulled into the liquid body. This produces very high turbulence in the entire bath but particularly in the reaction chambers between the anode and cathodes of the double electrodes. This turbulence is indicated by the arrows in FIG. 8, arrows 27 showing the liquid flow at the point where the liquid, laden with sludge particles, is forced against, and reflected by, the bottom of the vessel while the arrows 28 show the turbulent liquid flow at the surface of the electrolyte which forces sludge particles from the surface back into the body of the liquid.

The schematically illustrated installation of FIG. 9 shows four treating vessels 1, 2, 3 and 4 adjacently arranged. An inlet main 35 for the liquid to be treated has four branches respectively feeding the vessels, inlet valves 31, 32, 33 and 34 being arranged in the respective branches of the inlet main to control the feeding of the liquid to the respective vessels. An outlet main 40 for the treated liquid has four branches leading from the respective vessels, outlet valves 36, 37, 38 and 39 being arranged in the respective branches of the outlet main to control the emptying of the treated liquid from the respective vessels. It may be desired to mount pumps in the inlet and/or outlet mains and/or their branches to facilitate the feeding and emptying of the liquid to and from the vessels.

A liquid sampling main 41 also has four valved branches leading into respective ones of the vessels so that samples of the treated liquid may be removed from the vessels, a pump 42 in main 41 conveying the sampled liquid to a receptacle 43 in which are arranged a bank of sampling probes 44. These probes may be designed to measure and indicate the redox potential, the pH-value of the liquid sample, its oxygen content, its color, its turbidity, its temperature or its electrical conductivity, for example. The measured values of the probes produce corresponding control signals transmitted by conductors 45 to a control unit 46 which may include such automation equipment as signal generators, analogue digital converters, indicators of the measured values, including, if desired, recorders of the measured values, digital computers and computer card controls responsive to the control signals received from probes 44. The control signals from control unit 46, which are produced in response to the control signals from the probes, are transmitted by conductors 47 and 48 to current supply units 49 and 50 which are interphase transformers-rectifiers. In a manner not particularly shown as forming no essential part of the invention and being well known per se, the current supply units 49 and 50 are also controlled by the voltage and the current in the treating vessels, which are constantly measured by special test electrodes and ammeters. The high-voltage lines 51 lead from the current supply units 49 and 50 to the electrodes in the vessels 1 to 4 to feed current thereto for the electrical treatment of the liquid batches in the vessels.

Pump 42 feeds samples of the liquid batches in the vessels steadily to receptacle 43 so that a continuous control of the operation is obtained. At given time intervals, the receptacle is automatically rinsed and cleaned.

A modified embodiment of a double electrode for use in the treating vessels is shown in FIGS. 10a and 10b. Inasmuch as this modification is like the embodiment of FIGS. 4a and 4b, the description thereof will not be repeated here. In this modified embodiment, however, two anodes 6a and 6b are mounted side by side in insulation from each other, insulating frames 52 carrying the anodes, as shown in FIG. 10b. Such an electrode is of particular advantage when the aqueous liquid to be treated contains an organic solute or has organic particles suspended therein since the removal of such organic matter from the liquid requires it to be passed as often as possible along the diffusion layer of the anode so as to expose it to the reaction with the oxygen liberated in this layer along the surfaces of the anodes.

This embodiment may be operated by first supplying current to the one electrode 6a, which is made of a soluble material, to initiate the precipitation or flocculation reaction with the organic solids in the liquid. After sufficient precipitation has set in, anode 6a is disconnected and the other anode 6b, which is made of an insoluble material, is connected to the current supply to produce atomic, electrically charged oxygen by the decomposition of water. This oxygen in the region of the diffusion layer along the anode will produce a cold combustion of the organic matter during the treatment. As far as particulate, the oxidation products are then precipitated and the resultant gas is vented to the atmosphere.

In certain treatments, it will be advantageous to use anodes of different materials, the replacement of the anode plates according to specific needs being very simple in the illustrated electrode structures. It may also be desirable to connect and disconnect selected electrodes according to specific needs. Switch means for connecting and disconnecting the selected anodes 6a and 6b are preferably built into the double electrodes to form a structural unit therewith. This considerably simplifies the current supply and switching during operation.

One embodiment of such a unit is shown in FIG. 11 wherein the cathodes 7 are connected to current supply conductors 55 and 56 while the anodes 6a, 6b are connected to current supply conductors 57, 56, the conductors leading to a double-acting electromagnetic switching instrument 59 which is connected by conductors 60 and 61 to an alternating and direct current source, respectively. The switching instrument 59 makes it possible to supply the respective electrodes selectively with alternating or direct current of both polarities.

The vertical arrangement of the electrodes in the treating vessels produces a large treating surface in relation to the amount of liquid in each treated batch. This, in conjunction with an intense mechanical agitation of the liquid in the vessel, produces a very active reaction of the oxygen along the electrodes with the solid components of the treated aqueous liquid.

The oxygen production may be substantially increased by adding sulfuric acid to the liquid being treated. This causes the production of hydrogen peroxide during the electrical treatment which readily decomposes at the anode and thus further increases the supply of atomic oxygen which aids in the efficiency of the process for removing the solid content from the aqueous liquid.

It is also possible to add hydrogen peroxide to the liquid batches either before or after electric current is passed therethrough, this being of particular advantage in the treatment of waste water containing large amounts of solutes or suspended particles.

FIGS. 12 and 13 illustrate installations for purifying aqueous liquids to which oxidizing agents may be added to improve the purification results.

In the embodiment of FIG. 12, the liquid to be treated is fed to the treating vessels 1 to 4 through main 35 whose valved branches lead to the respective vessels. The electrodes in the vessels (not shown in this figure) are supplied with current from current source 50 by means of conductors 51 (see also FIG. 9 for details of this arrangement). Selector switches 62 are provided in the current supply conductors 51.

An outlet main 40 removes the liquid batches from the treating vessels to a receptacle 63, after the same have been treated, and a high-speed agitator or stirrer 64 in receptacle 63 thoroughly mixes the liquid with the sludge therein. This thoroughly mixed liquid is removed from receptacle 63 by conduit 65 to separator 66 in which vessel the solid contents are separated from the water. The purified liquid leaves the vessel 66 through outlet pipe 67.

The selector switches 62 in current supply circuit 51 are also connected to a small electrolyte cell 69 by conductors 68, sulfuric acid of medium concentration being electrolyzed in this cell at high current densities to produce persulfuric acid ($H_2S_2O_8$) at the anodes. This is converted into hydrogen peroxide in a known manner and added to the liquid in receptacle 63 through dosing line 70 leading from the electrolytic cell to the receptacles.

An alternative embodiment of an hydrogen peroxide addition to the liquid batches in the treating vessels themselves is shown in FIG. 13 whose arrangement, as far as identical with that of FIG. 12, will not be described again. In this embodiment, the hydrogen peroxide is fed into the main 35 through conduit 70 leading from the electrolytic cell 69 to the main. The selector switches are operated to supply current thereto when no current is supplied to the electrodes in the treating vessels, according to the treatment cycles explained hereinabove in connection with FIG. 2.

If desired, sulfuric acid in the electrolytic cell may be replaced by potassium manganate which is converted to potassium permanganate and fed to the liquid in the treating vessels or receptacle 63 instead of hydrogen peroxide.

A preferred embodiment of receptacle 63 for the thorough and intense mixing of the treated aqueous liquid batches coming from the treating vessels is shown in FIGS. 14a and 14b. A high-speed stirrer is rotated by electro-motor 71 and extends coaxially into the receptacle which receives the treated liquid through an inlet conduit 72 tangentially arranged at the top of the receptacle while an outlet conduit 73 removes the thoroughly mixed liquid from the bottom of the receptacle and is bent upwardly to the plane of the level 74 of the liquid 75 in receptacle 63.

The batchwise electrical treatment of the aqueous liquid in closed treating vessels avoids power losses due to current being supplied to the liquid outside the actual treatment zones, as is the case in treatment chambers through which the liquid flows continuously. Therefore, the method of the present invention saves considerable electrical energy.

Another important saving in electric power and a considerable increase in the efficiency of the electrolytic treatment is produced according to this invention by the use of soluble anodes which introduce ions into the liquid being treated and thus considerably increase the precipitation or flocculation effect on the solid contents of the aqueous liquid batches. This is of particular importance at the beginning of the electrical treatment of each aqueous liquid batch. In this phase of the operation, it is advantageous for particles of the soluble anode to be introduced into the liquid without the liquid immediately flowing away, which is the case in a continuous passage of the liquid through a treating vessel.

The electric treatment of the aqueous liquid causes the formation of $H_2$ bubbles which attach themselves to the sludge particles in the liquid being treated, and the bubbles carry the sludge to the surface. Thorough stirring of the liquid in the treating vessel causes the surface sludge to be mixed again with the liquid, and solids which may be more difficult or impossible to precipitate by electric treatment will attach themselves to the sludge particles in this stage of the treatment, thus further increasing the efficiency of the operation. The stirring is preferably effected at timed intervals.

In the same way, the initial phase of the treatment will be actively supported if a residue of the treated liquid, which has sludge mixed into it, is left in the treating vessel when the major portion thereof is removed after treatment so that this residue becomes part of the next batch in the vessel.

In the hereinabove preferred embodiments, a direct current whose frequency lies above the frequency of the public electric supply system is supplied to the treating electrodes by a polyphase rectifier. In this case, the amplitude of the ripple of the current is relatively low in respect to the median of the direct current, which is advantageous for introducing ions into the liquid under treatment. At the same time, the high frequency of the ripple of the current has a favorable influence on the motion of the particles which influence the precipitation or flocculation. It may be of further advantage to vary the harmonic frequency of the supplied current during the treatment. For instance, it is possible to supply during the initial phase of the treatment a direct current obtained by a 24-phase rectifier, which contains only 1.25 percent harmonic frequency, so that the liquid is ionized with ions from the anode. Subsequently, the supply may be switched atuomatically to a three-phase rectification whose direct current has about a 25 percent harmonic frequency whose frequency is primarily about 150 Hz. In this manner, a variation in the phase number of the current rectification in the current supply will considerably change the harmonic frequency of the supplied current and thus supply at desired time intervals more strongly pulsating electric energy. This is of particular significance in connection with the extent of movement of the individual particles in the liquid which is important for the agglomeration of the particles. The effectiveness of the pulsating electric energy may be further increased by simultaneous increases in the voltage at given intervals, causing strong convection between the electrodes. If high-speed stirring is effected at the same time, a very turbulent flow of the liquid will be produced in the treating vessel, thus considerably increasing the chemical reactions in the diffusion layer.

In the illustrated double electrodes, it is easy to detach deposits from the electrodes and thus to clean them simply by reversing the polarity of the electrodes. The control of such a polarity reversal may advantageously be responsive to an increase in the voltage over a set value. As soon as the voltage has returned to the desired range, the electrodes are switched back to their original polarity.

The control signals from the sampling probes hereinabove described may be used not only in an automated system for setting the harmonic frequency of the current but also for the addition of oxidizing agents, acids and/or alkalis during or after the treatment, a subsequent addition of a reagent being particularly useful when the liquid removed from the treating vessel contains a portion having an undersirably high solids content.

Chloride, for instance sodium chloride, may be added to the liquid to increase its conductivity and, furthermore, to produce chlorine during the electrolysis, which works as a disinfectant.

If the conductivity of the liquid is too high, it will be useful to mount resistances in the conductors leading to the electrodes.

It has been found that the speed of separation of the solids from the aqueous liquid after the electrical treatment and the purity of the liquid after the separation are considerably increased by a thorough and intense stirring of the treated liquid with its sludge while the treated liquid is removed from the treating vessel. This effect is further increased when such stirring is effected after the electrical treatment and before the treated liquid is conveyed into the separator, as shown in FIGS. 12 to 14. If desired, separated sludge may be added to the liquid in receptacle 63.

The separation in vessel 66 may be effected by sedimentation or by flotation in a manner known per se. If flotation is used, water under pressure and containing dissolved gases may be introduced into the liquid as it is being passed into the flotation vessel.

The speed of the electrical treatment, particularly its initial phase, will be increased if separated sludge of a previous batch is added to the liquid in the treating vessel, such sludge containing positive carrier particles of anode metal and thus reducing the wear of the anode during the treatment.

The method of the present invention is very efficient and works very well even in difficult cases where the aqueous liquid to be purified contains excessive amounts of impurities and/or impurities which are not biodegradable, including aqueous liquids containing high amounts of suds, filth, ammonium or hydrogen sulfide, etc. All of these are very largely removed by the treatment according to this invention. For instance, an electrical treatment of no more than five to seven minutes and subsequent thorough stirring, followed by sedimentation, has effectively purified urban sewage having a biochemical requirement of 1,000 mg of oxygen per liter of sewage, removing the solids contents of the sewage sufficiently to reduce the biochemical oxygen requirements by more than 85 percent. By comparison, biodegrading the same sewage for several hours reduces the oxygen requirement only to about 200 mg/l, even this degree of purification often requiring a two-stage biological purification.

At times, it is found impossible to remove all deposits from the electrodes by reversing their polarity, as described hereinabove, thus reducing the efficiency of the electrical treatment because no current enters the liquid from the dirty portions of the electrodes, and a greatly increased current is supplied from the clean electrode portions, causing corrosion of these portions of the electrodes. In such instances, where the solid contents of the aqueous liquid being treated tends to form excessive deposits on the electrodes, it is preferred to clean the same mechanically. For this purpose, the electrodes may be rinsed during the treatment with a high pressure fluid medium, such as water under pressure or steam. This may be done even while the electrodes receive electric current by arranging conduits between the electrodes to eject the cleaning fluid under high pressure against the electrode surfaces and thus to clean the same.

The soluble anodes described herein may be made of any suitable anode material which is soluble under the described electrical treatment conditions, including iron, zinc, aluminum, such anode plates having preferably a thickness in the range of one-eighth to one-half inch.

The insoluble anodes may be made of any suitable anode material insoluble or nearly insoluble under the described treatment conditions, including carbon, titanium, platinum or platinized metal, preferably corrosion resistant steel as $V_4A$ type.

The cathodes may be made of any suitable cathode material, including iron and acid resistant antimagnetic steel.

I claim:

1. A method of purifying an aqueous liquid containing substances to be removed from the liquid, comprising the steps of 1. charging a batch of the aqueous liquid to be purified into a treating vessel,
2. closing the vessel to prevent liquid inflow or outflow and to maintain the aqueous liquid batch stationary,
3. passing an electric current through a cathode and a soluble anode immersed in the aqueous liquid batch in the vessel to subject the liquid to an electrical treatment causing the substances in the liquid to precipitate into particles forming a floating sludge on the liquid,
4. thoroughly stirring the aqueous liquid batch during the electrical treatment in the closed vessel to mix the floating sludge with the liquid,
5. opening the vessel after the electrical treatment has been concluded to permit a major portion of the treated aqueous liquid batch to flow out of the vessel while a residual portion of the treated liquid is retained in the vessel as an addition for the subsequent batch to be treated in the vessel, and
6. separating the precipitated substances from the major portion of the aqueous liquid removed from the vessel to recover the purified liquid.

2. The method of claim 1, wherein the precipitated substances are separated by sedimentation.

3. The method of claim 1, wherein the precipitated substances are separated by flotation.

4. The method of claim 1, further comprising the steps of subjecting electric current from a current supply network to polyphase rectification to obtain a current having a ripple frequency in excess of that of the current from the supply network, and supplying the high-frequency direct current to the cathode and anode.

5. The method of claim 1, wherein a series of said vessels are sequentially charged with respective ones of said aqueous liquid batches, the respective batches being sequentially subjected to said electrical treatment and stirring, and being sequentially opened in such timed sequence that a substantially continuous flow of treated aqueous liquid comes from the series of vessels.

6. The method of claim 1, wherein a plurality of double electrodes are immersed in the aqueous liquid batch, each double electrode comprising two outer cathodes and an intermediate anode arranged therebetween, the electric current being passed through the cathodes and anode of said double electrodes.

7. The method of claim 1, further comprising the step of immersing in the aqueous liquid batch also an insoluble anode, electrolysis producing nascent oxygen at the insoluble anode.

8. The method of claim 7, wherein direct current is supplied to the soluble anode and alternating current is simultaneously supplied to the insoluble anode.

9. The method of claim 1, wherein the cathode and the anode extend vertically in the aqueous liquid batch, the liquid being subjected to the electrical treatment in the interspaces between the cathode and anode.

10. The method of claim 1, further comprising the step of reversing the polarity of the cathode and anode at intervals during the electrical treatment.

11. The method of claim 1, further comprising the step of varying the harmonic frequency of the current passed through the liquid during the electrical treatment.

12. The method of claim 11, further comprising the steps of sampling physico-chemical parameters of the liquid batch under electrical treatment, producing control signals responsive to the sampled parameters, and varying the harmonic frequency of the current passed through the liquid during the electrical treatment in response to the control signals.

13. The method of claim 1, further comprising the steps of subjecting electric current from a current supply network to polyphase rectification to obtain a current having a ripple frequency in excess of that of the current from the supply network, supplying the high-frequency ripple containing direct current to the cathode and anode, and switching the number of the phases in the rectification to vary the harmonic frequency of the current.

14. The method of claim 1, further comprising the steps of sampling physico-chemical parameters of the liquid batch under electrical treatment, producing control signals responsive to the sampled parameters, and adding reagents to the liquid under treatment in response to the control signals.

15. The method of claim 1, further comprising the step of adding sulfuric acid to the liquid batch.

16. The method of claim 1, further comprising the step of adding a chloride to the liquid batch.

17. The method of claim 1, further comprising the step of adding hydrogen peroxide to the liquid batch before it is subjected to the electrical treatment.

18. The method of claim 1, further comprising the step of adding hydrogen peroxide to the liquid batch after it has been subjected to the electrical treatment.

19. The method of claim 1, further comprising the step of thoroughly stirring the treated aqueous liquid batch together with the formed sludge, as the major portion of the batch is permitted to flow out of the vessel.

20. The method of claim 1, further comprising the step of thoroughly stirring the treated aqueous liquid batch after the electrical treatment and before the precipitated substances are separated therefrom.

21. The method of claim 20, wherein the major portion of the treated aqueous liquid batch is conveyed into receptacle wherein it is thoroughly stirred, and the precipitated substances are then removed from the liquid in a subsequent vessel.

22. The method of claim 20, wherein precipitated substances separated from a previous batch are admixed with the treated aqueous liquid batch.

23. The method of claim 1, further comprising the step of adding to the batch in the vessel precipitated substances separated from a previous batch, the precipitated substances including carrier particles consisting of the soluble material of the anode.

24. The method of claim 1, further comprising the step of cleaning the cathode and anode during the electrical treatment with a fluid medium under high pressure.

* * * * *